(12) United States Patent
Sinha et al.

(10) Patent No.: US 8,452,465 B1
(45) Date of Patent: May 28, 2013

(54) SYSTEMS AND METHODS FOR ECU TASK RECONFIGURATION

(75) Inventors: Purnendu Sinha, Bangalore (IN); Thomas E. Fuhrman, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/467,613

(22) Filed: May 9, 2012

(30) Foreign Application Priority Data

Mar. 30, 2012 (IN) .............................. 369/KOL/2012

(51) Int. Cl.
*G06F 17/00* (2006.01)

(52) U.S. Cl.
USPC ........... 701/2; 701/31.4; 365/63; 365/189.08; 365/203; 365/230.05; 365/233.17

(58) Field of Classification Search
USPC .................. 701/2, 31.4; 365/63, 189.08, 203, 365/230.05, 233.17; 375/222; 713/2, 100; 714/3, 10; 370/465; 700/300, 277; 702/119; 703/27; 439/188
See application file for complete search history.

(56) References Cited

U.S. PATENT DOCUMENTS

| | | | |
|---|---|---|---|
| 5,377,322 A | 12/1994 | Ogura et al. | |
| 5,957,985 A | 9/1999 | Wong et al. | |
| 6,654,910 B1 | 11/2003 | Eibach et al. | |
| 6,897,629 B2 | 5/2005 | Wilton et al. | |
| 7,039,511 B1 * | 5/2006 | Kreuz et al. | 701/36 |
| 7,245,995 B2 | 7/2007 | Kueperkoch et al. | |
| 7,302,320 B2 * | 11/2007 | Nasr et al. | 701/22 |
| 7,538,512 B2 | 5/2009 | Discenzo | |
| 7,564,208 B2 | 7/2009 | Bailey et al. | |
| 7,630,800 B2 | 12/2009 | Hirano et al. | |
| 7,756,621 B2 * | 7/2010 | Pillar et al. | 701/41 |
| 2002/0103583 A1 | 8/2002 | Ohmura et al. | |
| 2004/0167689 A1 | 8/2004 | Bromley et al. | |
| 2005/0010341 A1 | 1/2005 | MacNamara et al. | |
| 2007/0081473 A1 | 4/2007 | Jiang | |
| 2008/0291014 A1 | 11/2008 | Chigusa et al. | |
| 2009/0326981 A1 * | 12/2009 | Karkanias et al. | 705/3 |
| 2010/0179720 A1 | 7/2010 | Lin et al. | |
| 2010/0261048 A1 | 10/2010 | Kim et al. | |
| 2010/0305792 A1 * | 12/2010 | Wilk et al. | 701/22 |
| 2010/0318812 A1 * | 12/2010 | Auradkar et al. | 713/193 |
| 2011/0098890 A1 | 4/2011 | Lee et al. | |
| 2012/0173905 A1 * | 7/2012 | Diab et al. | 713/320 |

OTHER PUBLICATIONS

Jeffrey C. et al., The Integration of On-Line Monitoring and Reconfiguration Functions using IEEE1149.4 Into a Safety Critical Automotive Electronic Control Unit, , Proceedings of the Designs, Automation and Test in Europe Conference and Exhibition (2005).
Richard Anthony et al., A Dynamically Reconfigurable Automotive Control System Architecture, The International Federation of Automatic Control, Jul. 6-11, 2008, Seoul, Korea.

* cited by examiner

*Primary Examiner* — McDieunel Marc
(74) *Attorney, Agent, or Firm* — Parks IP Law LLC

(57) ABSTRACT

Systems and methods for reconfiguring ECU tasks for ensuring that a vehicle is operational upon failure of a task or an ECU. A first on-board reconfiguration strategy is generated and executed by an on-board unit of the vehicle to bring the vehicle to a safe state and a second off-line reconfiguration strategy is generated by a remote center unit and then executed by the on-board unit.

20 Claims, 3 Drawing Sheets

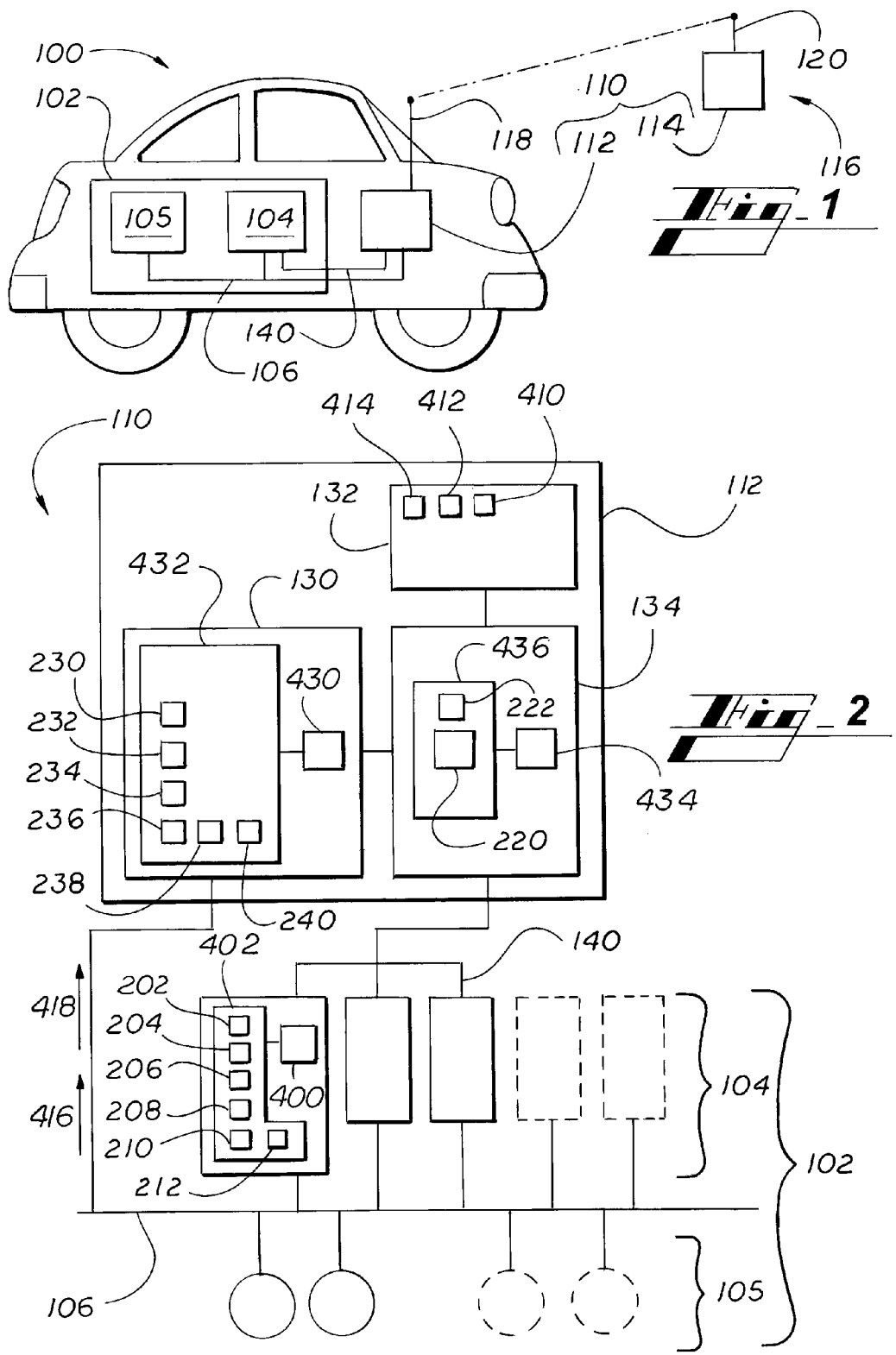

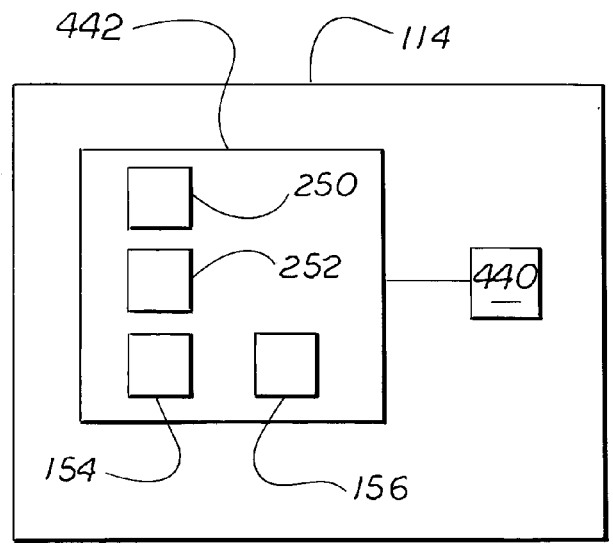
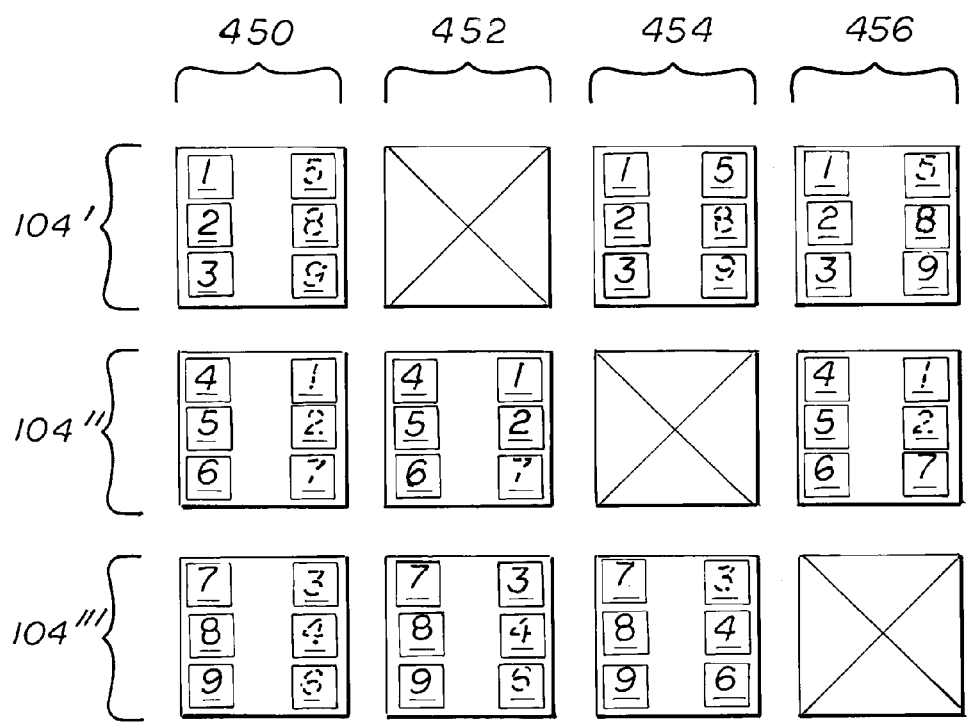

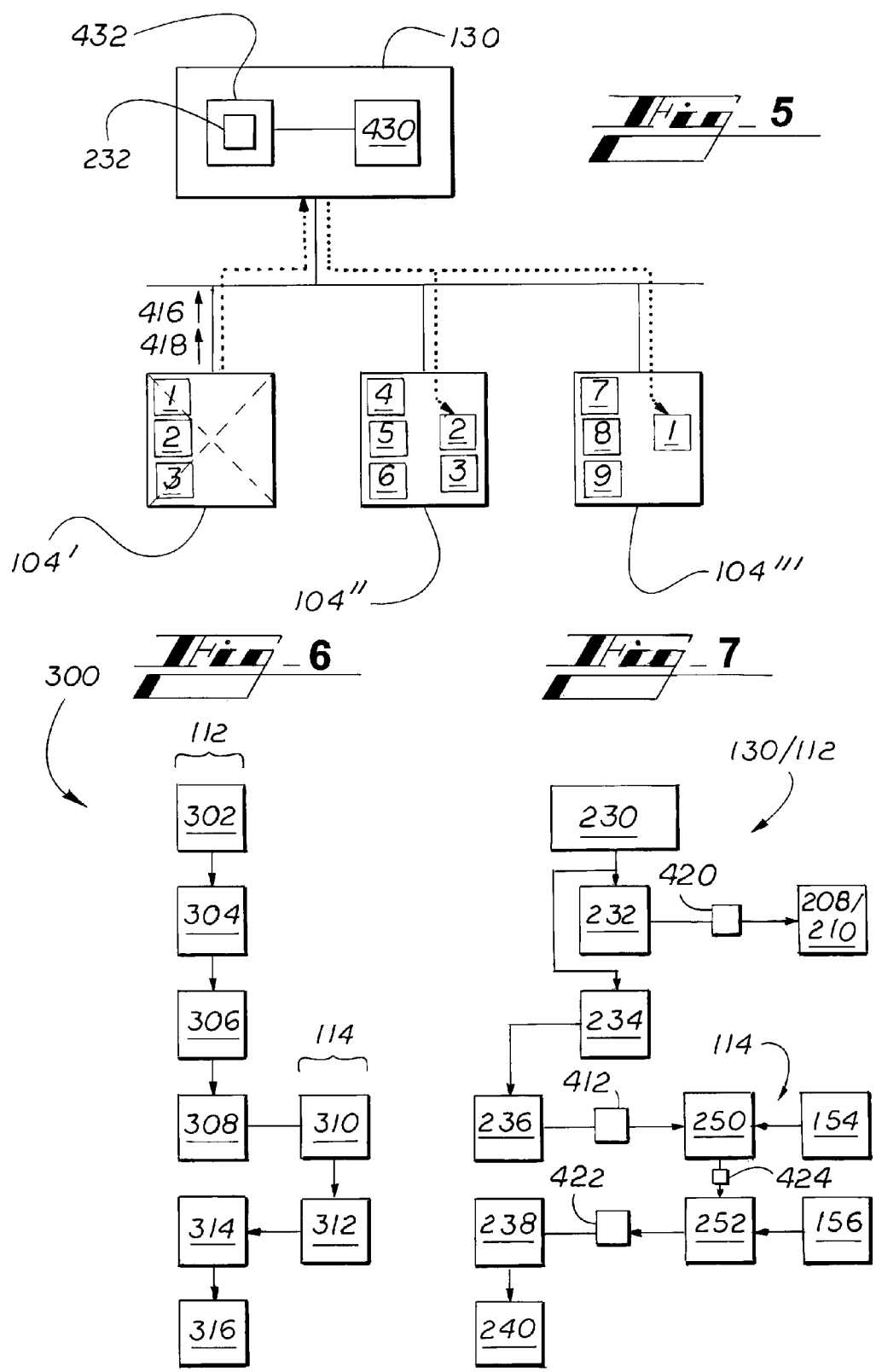

SYSTEMS AND METHODS FOR ECU TASK RECONFIGURATION

TECHNICAL FIELD

The general technical field is vehicle control and maintenance.

BACKGROUND

Vehicles include electrical systems with electronic control units (ECUs) that control components, such as actuators, based on input from components, such as sensors. The ECUs execute tasks to control electrical system components. Upon failure of an ECU or of execution of a safety-critical task, reconfiguration of failed tasks is one way to maintain safe operation of the vehicle. However, vehicles have limited resources available to perform such reconfiguration.

SUMMARY

The various embodiments described herein provide systems and methods for reconfiguring ECU tasks. The systems and methods are cost-effective and keep a vehicle operational upon failure of an ECU or of execution of a safety-critical task. Generally, a first on-board reconfiguration strategy is generated and executed by an on-board unit to bring the vehicle to a safe state and a second off-line reconfiguration strategy is generated by a remote unit, such as a command center unit, and then executed by the on-board unit. The generation of the on-board reconfiguration strategy is focused on quickly finding a workable solution that is able to bring the vehicle to a safe state. The generation of the off-line reconfiguration strategy is more complicated and optimizes the operation of the vehicle according to heuristics, fault models, and system models.

According to an exemplary embodiment, a method of reconfiguring a task of an ECU of a vehicle includes steps performed by an on-board unit associated with a vehicle and steps performed by a remote unit, such as a command center unit, associated with a command center. The steps performed by the on-board unit include detecting failure of one or more tasks or of one or more ECUs; generating a first reconfiguration strategy as a function of the failed task or ECU; executing the first reconfiguration strategy; gathering health data associated with the ECUs; and sending the health data to the remote unit. For example, a reconfiguration strategy is generated (1) to reconfigure a task which failed on a working ECU (e.g., due to resource limitations) to execute on another ECU or (2) to reconfigure a set of one or more tasks which is allocated to a failed ECU to execute on one or more working ECUs.

The steps performed by the remote unit include generating a second reconfiguration strategy as a function of the health data, fault models, and system models; and sending the second reconfiguration strategy to the on-board unit. The on-board unit then executes the second reconfiguration strategy.

The foregoing has broadly outlined some of the aspects and features of the various embodiments, which should be construed to be merely illustrative of various potential applications. Other beneficial results can be obtained by applying the disclosed information in a different manner or by combining various aspects of the disclosed embodiments. Other aspects and a more comprehensive understanding may be obtained by referring to the detailed description of the exemplary embodiments taken in conjunction with the accompanying drawings, in addition to the scope defined by the claims.

DESCRIPTION OF THE DRAWINGS

FIG. 1 is a schematic illustration of a reconfiguration system associated with a vehicle and a command center.

FIG. 2 is a schematic illustration of an on-board unit of the reconfiguration system of FIG. 1.

FIG. 3 is a schematic illustration of a remote unit of the reconfiguration system of FIG. 1.

FIG. 4 is a schematic illustration of a set of pre-determined reconfiguration strategies of a software application of the on-board unit of FIG. 2.

FIG. 5 is a schematic illustration of a run-time determination of a reconfiguration strategy of another software application of the on-board unit of FIG. 2.

FIG. 6 is a schematic illustration of an exemplary reconfiguration method associated with the reconfiguration system of FIG. 1.

FIG. 7 is a schematic illustration of elements of the reconfiguration system of FIG. 1 associated with the reconfiguration method of FIG. 6.

DETAILED DESCRIPTION

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Systems and methods are described herein in the context of a motor vehicle. However, the systems and methods described herein can be applied to various types of vehicles including automobiles, cars, trucks, other land vehicles, watercraft, aircraft, remotely-operated vehicles, and the like.

Vehicle

Referring to FIGS. 1 and 2, a vehicle 100 includes an electrical system 102 that includes electronic control units (ECUs) 104, electrical components 105, wiring harnesses, data links 140, and communications busses 106. The electrical components 105 include sensors, actuators, subsystems, combinations thereof, and the like. Exemplary subsystems include an engine system, a powertrain system, a transmission system, a brake system, a timing system, a suspension system, and the like.

For simplicity, only one electrical component 105 and one ECU 104 are shown in FIG. 1. A more detailed arrangement of ECUs 104 and electrical components 105 is shown in FIG. 2. The ECUs 104 are configured to communicate with the electrical components 105 via the communications bus 106.

Referring to FIG. 2, the ECUs 104 include processors 400, local memory 402, and software applications described in further detail below. Each ECU 104 is configured to control one or more of the electrical components 105 of the vehicle 100 as a function of input from one or more electrical components 105. Exemplary ECUs include an electronic/engine control module, a powertrain control module, a transmission control module, a brake control module, a central control module, a central timing module, a general electronic module, a body control module, a suspension control module, a steering control module, and other like control units and control modules.

For purposes of teaching, according to an exemplary embodiment, certain of the ECUs 104 and electrical components 105 are associated with safety-critical tasks and certain of the ECUs 104 and electrical components 105 are associated with non-safety-critical tasks. In other embodiments, certain ECUs 104 and electrical components 105 are associated with both safety-critical tasks and non-safety-critical tasks, referred herein as mixed-criticality tasks. ECUs 104 associated with mixed-criticality tasks can implement middleware (e.g., AUTOSAR) to spatially and temporally isolate the tasks having different criticality. Safety-critical tasks are taken into account as described below whether performed by an ECU 104 having all safety-critical tasks or by ECUs 104 with mixed-criticality.

For purposes of illustration, referring to FIG. 2, safety-critical ECUs 104 and electrical components 105 are shown with solid lines and non-safety-critical ECUs 104 and electrical components 105 are shown with dashed lines. For example, safety-critical tasks control the motion of the vehicle 100 in one or more of its degrees of freedom (e.g. longitudinal acceleration is affected by the powertrain, longitudinal deceleration is affected by the braking, lateral control is affected by the steering, and vertical control is affected by the suspension. Non-safety-critical tasks control, for example, the driver or passenger cabin environment, such as HVAC (heating, ventilation, and air conditioning), interior lights, power windows, power door locks, entertainment systems such as radios and CD (compact disc) players, navigation systems, etc.

Reconfiguration System

Referring to FIGS. 1-3, a reconfiguration system 110 is configured to reconfigure the tasks of the ECUs 104 in the event of failure of one or more of the tasks or one or more of the ECUs 104. Further, the reconfiguration system 110 is configured to handle failures in sensors, actuators, wiring harnesses, communication busses, software bugs, combinations thereof, and the like.

The reconfiguration system 110 reconfigures the tasks according to a two-part reconfiguration strategy. Generally, a first reconfiguration strategy is generated and executed on-board the vehicle 100 with the vehicle's resources to bring the vehicle 100 to a safe state and a second off-line reconfiguration strategy is generated at a command center 116 with the command center's resources, communicated to the vehicle 100, and then executed on-board the vehicle 100.

The resources of the command center resources are greater than the resources of the vehicle and can provide an improved reconfiguration. The generation of the on-board reconfiguration strategy is focused on quickly finding a workable solution that is able to bring the vehicle to a safe state, such as by reconfiguration of one or more safety-critical tasks. The generation of the off-line reconfiguration strategy is more complicated and optimizes the operation of the vehicle according to heuristics, fault models, and system architecture and can include reconfiguration of tasks (e.g., both safety-critical and non-safety-critical) as well as electrical components.

The reconfiguration system 110 includes an on-board unit 112 and a remote unit 114. The on-board unit 112 is associated with the vehicle 100 and the remote unit 114 is associated with a command center 116. The command center 116 is infrastructure that is generally located at a remote location. Exemplary on-board units and remote units include those that operate in the OnStar System®, vehicle-to-infrastructure (V2I) communication systems, and the like (OnStar is a registered trademark of OnStar, LLC, a subsidiary of the General Motors Company). The on-board unit 112 and the remote unit 114 are configured to communicate with one another via long-range communications channels, such as a satellite communication system or a cellular communication system, as commonly used for telematics. In the exemplary embodiment, each of the on-board unit 112 and the remote unit 114 includes a transceiver 118, 120 to facilitate communication. The transceiver 118 is configured such that signals generated by the on-board unit 112 can be transmitted by the transceiver 118. Signals that are received by the transceiver 118 can be passed to, and stored and processed by, the on-board unit 112, as described in further detail below.

In a similar manner, the transceiver 120 is configured to transmit signals generated at the remote unit 114, such as to the transceiver 118 of the vehicle 100. And the transceiver 120 is configured to receive signals, such as those transmitted by the transceiver 118 of the vehicle, and pass associated data to the remote unit 114 for storing and/or processing.

Referring to FIG. 2, the on-board unit 112 is a unit that continues to operate in the event of failure of one of the electrical systems 102. The on-board unit 112 is configured to detect ECU 104 failure and individual task failure, generate and execute a robust on-board reconfiguration strategy, bring the vehicle 100 to a safe state, send health data to the remote unit 114, and execute an optimized reconfiguration strategy that is generated by and received from the remote unit 114.

Continuing with FIG. 2, the on-board unit 112 includes a reconfiguration manager 130; a shared memory 132 or other tangible, non-transitory, computer-readable media; and a memory controller 134. The shared memory 132 includes a code-image of all safety-critical tasks 410.

The reconfiguration manager 130 is a centralized supervisory controller that is configured to monitor health data 412 and check-pointed task state 414; detect faults, individual task failure, and ECU failure from fault signals 416 and aliveness messages 418; determine on-board reconfiguration strategies 420 (shown in FIG. 7); execute on-board reconfiguration strategies 420 and bring vehicle to safe state; facilitate and execute off-line reconfiguration strategies 422 (shown in FIG. 7); confirm execution of off-line reconfiguration strategies 422; and restart the vehicle 100. For example, the reconfiguration strategies are executable scripts. The reconfiguration manager 130 includes a processor 430, local memory 432, and software applications described in further detail below.

The memory controller 134 is configured to manage the flow of data between the local memories of the ECUs 104 and the shared memory 132 and between the shared memory 132 and the reconfiguration manager 130. The memory controller 134 includes a processor 434, local memory 436, and software applications described in further detail below. The memory controller 134 is connected to safety-critical ECUs 104 via the data link 140 to facilitate data transfer from the ECUs 104 for storage in the shared memory 132. The reconfiguration manager 130 is connected to the ECUs 104 via the communication bus 106 to facilitate triggering ECU 104 reconfiguration, as described in further detail below.

Referring to FIG. 3, the remote unit 114 is configured to generate the off-line reconfiguration strategy 422 (see FIG. 7). The remote unit 114 includes a processor 440, memory 442, and software applications that are described in further detail below. The memory 442 includes a database of fault models 154 and a database of system models (vehicle architecture) 156. Fault models 154 contain information about possible hardware or software component failures (e.g., faults or bugs at one or more sensors, actuators, ECU processors, ECU memories, wiring harnesses, communication busses, and/or software applications), their relative likelihood of occurrence, and their dependencies. System models 156 (vehicle architectures) contain information on the specific sensors, actuators, ECUs, wiring harnesses, communication busses, and software applications actually present on a particular vehicle, and the manner in which they are connected (i.e., their connection topology).

Software Applications

Various software applications are now described in further detail. In general the software applications described herein are stored in local memory 402, 432, 436, 442 and include computer-executable instructions that, when executed by a processor 400, 430, 434, 440, perform steps of methods described herein.

While the methods described herein may, at times, be described in a general context of computer-executable instructions, the methods of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like. Each software application may include at least one tangible, non-transitory hardware component.

Computer readable media includes, for example, volatile media, non-volatile media, removable media, and non-removable media. The term computer-readable media and variants thereof, as used in the specification and claims, refer to tangible, non-transitory, storage media. In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

Referring to FIG. 2, for clarity, exemplary software applications associated with one of the ECUs 104 are now described. It should be understood that the description can be applied to each of the other ECUs 104. The ECU 104 includes a task application 202, a task state application 204, an ECU fault application 206, a reconfiguration status application 208, a new task application 210, and a health data application 212.

The task application 202 includes tasks that are associated with controlling respective ones of the electrical components 105 (e.g., actuators) based on input from respective ones of the electrical components 105 (e.g., sensors).

The state check application 204 includes instructions to periodically send the check-pointed task state of each task to the memory controller 134. The state is the status of the task and the check-pointed state is the state at a checkpoint time. For example, if (s1, s2, . . . , sn) are the individual states of n tasks (t1, t2, . . . , tn) at time t executing on an ECU, then the check-pointed state 414 is the set of individual states (s1, s2, . . . , sn) at a check-point time t. A task (e.g., t1) recovering from a fault can use its corresponding state (e.g., s1) contained in check-pointed state 414. State information may contain information pertaining to global memory, task state, messages communicated, etc. The check-pointed task state 414 is stored for retrieval in the shared memory 132 by the memory controller 134 such that a task can restart at a check-pointed task state 414 as opposed to starting from the beginning of a task.

The fault application 206 includes instructions to send task and hardware fault signals 416 and aliveness messages 418 to the reconfiguration manager 130. Fault signals 416 are event-triggered signals that indicate occurrence of specific detected faults such as failed sensors, corrupted memory, or faulty processors. Aliveness messages 418 are periodic messages that indicate continuing availability of specific resources such as processors or communication busses. As described in further detail below, the fault signal 416 or the aliveness message 418 can be used to detect a failure event.

The reconfiguration status application 208 includes instructions to send a reconfiguration status to the reconfiguration manager 130.

The new task application 210 includes instructions to execute the reconfiguration strategy 420, including newly-scheduled tasks, and ensure its completion. The new task application 210 executes secondary copies of tasks. To start the secondary copies of tasks where the primary copies of tasks left off, the new task application 210 includes instructions to copy check-pointed task states 414 from the shared memory 132 into the local memory 402 of the respective ECU 104. The new task application 210 is further configured to confirm the successful completion of an executed secondary copy of a task or notify the reconfiguration manager 130 to implement a different reconfiguration strategy 420 or option of a reconfiguration strategy.

A health data application 212 includes instructions for the ECUs 104 to send health data 412 to the memory controller 134 to be stored in the shared memory 132. Health data 412 is gathered for diagnostic purposes and includes tasks, states, time, failed task(s), failed ECU(s), history of execution of the task(s), check-pointed task states 414, fault signals 416, aliveness messages 418, summaries thereof, and the like.

Exemplary software applications associated with the memory controller 134 are now described. A state saving application 220 is configured to store check-pointed task states 414 in the shared memory 132. A health data saving application 222 is configured to store health data 412 in the shared memory 132.

Exemplary software applications associated with the reconfiguration manager 130 are now described. The reconfiguration manager 130 includes a failure detection application 230, an on-board reconfiguration application 232, a safe state application 234, a health data 236 application, an off-board reconfiguration application 238, and a reconfiguration status application 240.

The failure detection application 230 includes instructions to detect failure as a function of a fault signal 416 or an aliveness message 418 received or not received from an ECU 104. If a fault signal 416 is received, failure is detected. Alternatively, if an aliveness message 418 is not received, failure is detected.

The on-board reconfiguration application 232 includes instructions to generate and execute the on-board reconfiguration strategy 420 upon detection of ECU 104 or task failure. Referring to FIGS. 4 and 5, instructions for generating exemplary on-board reconfiguration strategies 420 are described in further detail. Referring to FIG. 4, instructions for generating a first exemplary on-board reconfiguration strategy 420 include selecting from different reconfiguration strategies that have been defined beforehand. In this embodiment, multiple ECUs 104 include a copy of a task in local memory 402. A primary copy of each task is configured to be executed on one of the ECUs 104 during normal operation. Secondary copies of the task are mapped to be on standby on other of the ECUs 104. The on-board reconfiguration application 232 selects one of the reconfiguration strategies which instructs the reconfiguration manager 130 of which secondary copies of a task is to be invoked upon failure of the primary copy of the task or failure of the ECU 104 on which the primary copy is executed. The secondary copies of tasks are mapped onto other ECUs 104 in such a way that all the primary copies of tasks have secondary copies that can be invoked on other ECUs 104.

FIG. 4 illustrates an exemplary pre-determined mapping strategy that facilitates selection of the on-board reconfiguration strategy 420 by the on-board reconfiguration application 232 as a function of a failed one of the ECUs 104. A first column 450 shows exemplary primary copies of tasks 1, 2, 3, 4, 5, 6, 7, 8, 9 (shown with solid lines) running on three ECUs 104', 104", 104'" respectively during normal operation and exemplary secondary copies of tasks 1, 2, 3, 4, 5, 6, 7, 8, 9 (shown with broken lines) that are mapped onto the ECUs 104', 104", 104'" and remain on standby.

Each of the second, third, and fourth columns 452, 454, 456 corresponds to a failed one of the three ECUs 104', 104", 104'". The failed ECU 104', 104", 104" is represented with an "X" through the ECU 104', 104", 104". In each column 452, 454, 456, primary copies of tasks 1, 2, 3, 4, 5, 6, 7, 8, 9 from the first column 452 continue to run on the remaining two operational ECUs 104 and certain secondary copies of the tasks 1, 2, 3, 4, 5, 6, 7, 8, 9 that have primary copies on the failed ECU 104 are also invoked on the ECUs 104 that remain operational. For example, if ECU 104' fails, on-board reconfiguration application 232 includes instructions to use column 452 to notify ECU 104" to execute the secondary copies of tasks 1, 2 and notify ECU 104'" to execute the secondary copy of task 3.

According to a second embodiment illustrated in FIG. 5, secondary copies of tasks are not stored on ECUs 104. Rather, the on-board reconfiguration application 232 (reconfiguration manager 130 is simplified in FIG. 5) includes instructions to generate a second exemplary on-board reconfiguration strategy 420 that optimizes the mapping of tasks of one or more failed ECUs 104 as a function of the collected utilization status of the ECUs 104 and the required utilization of the failed critical tasks. More particularly, the on-board reconfiguration application 232 includes instructions to generate the on-board reconfiguration strategy 420 by: polling each ECU 104 at a certain interval to get current and/or projected processor and/or resource utilization and map the failed critical tasks to the operational ECUs 104 as a function of the collected utilization status of the ECUs 104 and the required utilization of the failed critical tasks.

The on-board reconfiguration 232 includes instructions to execute the on-board reconfiguration strategy 420 to implement the mapping strategy. The mapping strategy is implemented by sending a request to schedule one or more tasks to operational ones of the ECUs 104. Upon receiving a request, the ECUs 104 are configured to copy both code images of respective tasks 410 and required check-pointed task states 414 from the shared memory 132.

Referring again to FIG. 2, the reconfiguration manager 130 includes a safe state application 234 that includes instructions to, upon successful completion of the tasks which failed to execute on an ECU or were mapped on a failed ECU, disable (or signal the driver to disable) the features, functions, or electrical components 105 originally executed on the failed ECU 104 to place the vehicle systems (electrical systems 102) in a safe mode.

The reconfiguration manager 130 further includes a health data application 236 that includes instructions to collect health data 412 from the shared memory 132 and transmit the health data 412 to the command center 116 using the transceiver 118.

The reconfiguration manager 130 further includes a reconfiguration application 238 that is configured to execute an off-line reconfiguration strategy 422 that is received from the command center 116. The executed off-line reconfiguration strategy 422 installs new software, updates network configurations, and the like. The off-line reconfiguration strategy 422 includes multiple reconfiguration options that are ordered. For instance, the off-line reconfiguration strategy 422 is in one embodiment ordered according by reliability, availability, or another preference.

The reconfiguration application 238 includes instructions to execute the reconfiguration options of the off-line reconfiguration strategy 422 in order until an improved reconfiguration is found and the vehicle 100 is brought back into optimal working condition.

The reconfiguration manager 130 includes a reconfiguration status application 240 that is configured to determine if a reconfiguration option of the off-line reconfiguration strategy 422 is successful. If the reconfiguration option is not successful, the reconfiguration application 238 executes the next ordered reconfiguration option of the off-line reconfiguration strategy 422.

Referring again to FIGS. 3 and 7, the remote unit 114 includes a cause application 250 and a reconfiguration application 252. The cause application 250 is configured to determine a root cause 424 of a failure as a function of health data 412 and/or fault models 154. The reconfiguration application 252 is configured to generate a reconfiguration strategy 422 as a function of system architecture 156 and the root cause 424 of the failure.

Method

Referring to FIGS. 6 and 7, an exemplary method 300 performed by the reconfiguration system 110 is now described in further detail. As provided, during normal operation, according to the instructions of the task applications 202, the ECUs 104 perform their respective tasks to control certain of the electrical components 105 (e.g., actuators) based on input from certain of the electrical components 105 (e.g., sensors).

According to the instructions of the task state applications 204, the ECUs 104 take a snapshot of the states 414 of their tasks and send the check-pointed task states 414 to be stored for retrieval in the shared memory 132. According to the instructions of the state saving application 220, the check-pointed task states 414 are saved in an assigned location of the shared memory 132 (partitioned and allocated) by the memory controller 134. According to the instructions of the health data application 212, the ECUs 104 send health data 412 to be stored for retrieval in the shared memory 132. According to the instructions of the health data saving application 222, the health data 412 is saved in the memory 132 by the memory controller 134. According to the instructions of the fault application 206, the ECUs 104 periodically send aliveness messages 418 to the reconfiguration manager 130 and the ECUs 104 send fault signals 416 in the event of an indication of the occurrence of specific detected faults such as failed sensors, corrupted memory, or faulty processors.

At a failure detection step 302 of the reconfiguration method 300, according to the instructions of the failure detection application 230, the reconfiguration manager 130 receives or monitors aliveness messages 418 and fault signals 416 of the ECUs 104. The failure detection application 230 detects failure of an ECU 104 when an aliveness message 418 is not received within a certain time period or if a fault signal 416 is received.

At an on-board reconfiguration step 304, according to the instructions of the on-board reconfiguration application 232, upon detection of failure of one or more tasks or one or more ECUs 104, the reconfiguration manager 130 generates and executes a first on-board reconfiguration strategy 420. The reconfiguration manager 130 geherates the on-board reconfiguration strategy 420 according to one of the methods described above to reconfigure safety-critical tasks, which need to be completed to bring the vehicle 100 and electrical systems 102 to a safe state for a stipulated time period. The stipulated time period is the time for which the car needs to remain operational.

The on-board reconfiguration strategy 420 is executed according to the instructions of the new task application 210 such that the ECUs 104 execute the newly-assigned safety-critical tasks. According to the instructions of the reconfiguration status application 208, successful completion of the safety-critical tasks is confirmed to the reconfiguration manager 130.

At a safe state step 306, according to the instructions of the safe state application 234, the reconfiguration manager 130 brings the vehicle 100/electrical systems 102 to a safe state. The reconfiguration manager 130 disables (or signals the driver to disable) the: tasks (features/functions) originally executed on the failed ECU 104 to place the vehicle systems (e.g. electrical systems 102) in safe mode.

At a data assimilation step 308, according to the instructions of the health data application 236, the reconfiguration manager 130 gathers health data 412 from the shared memory 132 and uplinks the health data 412 to the command center unit 114 at the command center 116 via the transceiver 118.

According to a cause step 310, according to the instruction of the cause application 250, the remote unit 114 receives the health data 412 from the on-board unit 112 and accesses fault models 154 from the memory 442 or a server database. The remote unit 114 determines the root cause 424 of the failure as a function of the health data 412 and the fault models 154.

According to a reconfiguration step 312, according to the instructions of the reconfiguration application' 252, the remote unit 114 accesses system architecture information/models 156 from a memory 442 or a vehicle database. Using the system architecture 156, the remote unit 114 identifies possible ECUs 104 or electrical components 105 from available ECUs 104 and electrical components 105.

The remote unit 114 generates the off-line reconfiguration strategy 422, including a set of reconfiguration options for all failed tasks, as a function of the root cause 424 as well as the system architecture 156. The reconfiguration options are ordered by reliability, availability, or another preference. The remote unit 114 sends the reconfiguration strategy 422 to the on-board unit 112.

At an implementation step 314, according to instructions of the implementation application 238, the on-board unit 112 receives the off-line reconfiguration strategy 422 from the remote unit 114. Further, the reconfiguration manager 130 executes the off-line reconfiguration strategy 422, such as by installing new software, updating a network configuration, etc.

The reconfiguration options of the off-line reconfiguration strategy 422 are attempted in order, one by one, by the reconfiguration manager 130 until an improved reconfiguration is found and the vehicle 100 is brought back to an operating condition (either with fully or partially restored functionalities/features).

At a confirmation step 316, according to instructions of the reconfiguration status application 240, the reconfiguration manager 130 validates that the (updated vehicle configuration) ECUs 104 are functioning properly using diagnostic checks.

The above-described embodiments are merely exemplary illustrations of implementations that are set forth for a clear understanding of principles. Variations, modifications, and combinations associated with the above-described embodiments may be made without departing from the scope of the claims. All such variations, modifications, and combinations are included herein by the scope of this disclosure and the following claims.

What is claimed is:

1. A method, for reconfiguring a task initially assigned to a first electronic control unit (ECU) of a vehicle, comprising:
   at an on-board unit on the vehicle in communication with the ECU:
      detecting failure of the task;
      generating a first reconfiguration strategy in response to detecting the failure, the first reconfiguration strategy including a reassignment of the task to a second ECU of the vehicle;
      executing, by a processor, the first reconfiguration strategy;
      gathering health data associated with at least the first ECU;
      sending the health data to a remote unit that is separate from the vehicle;
      receiving a second reconfiguration strategy from the remote unit, the second reconfiguration strategy being generated as a function of the health data, fault models, and system models; and
      executing, by the processor, the second reconfiguration strategy.

2. The method of claim 1, wherein generating the first reconfiguration strategy includes selecting from a set of predetermined task reconfiguration strategies.

3. The method of claim 2, wherein detecting failure of the task is accomplished by detecting failure of the first ECU and selecting from the set of predetermined task reconfiguration strategies is performed as a function of the first ECU.

4. The method of claim 1, wherein the first reconfiguration strategy is generated as a function of (i) utilization data, concerning at least one of the first ECU and the second ECU, and (ii) utilization data concerning the failed task.

5. The method of claim 1, wherein detecting failure of the task is accomplished by detecting failure of the first ECU.

6. The method of claim 1, wherein the second reconfiguration strategy includes reconfiguration options that are ordered by at least one of reliability and availability.

7. An on-board unit of a reconfiguration system, the on-board unit being configured for use on a vehicle, the on-board unit comprising:
- a processor; and
- a computer-readable medium, in communication with the processor, comprising applications that, when executed by the processor, cause the processor to perform acts including:
  - detecting failure of a task initially assigned to a first electronic control unit (ECU) of the vehicle;
  - generating a first reconfiguration strategy in response to detecting the failure, the first reconfiguration strategy including a reassignment of the task to a second ECU of the vehicle;
  - executing the first reconfiguration strategy;
  - gathering health data associated with at least the first ECU;
  - sending the health data to a remote unit that is separate from the vehicle;
  - receiving a second reconfiguration strategy from the remote unit, the second reconfiguration strategy being generated as a function of the health data, fault models, and system models; and
  - executing the second reconfiguration strategy.

8. The on-board unit of claim 7, wherein generating the first reconfiguration strategy includes selecting from a set of predetermined task reconfiguration strategies.

9. The on-board unit of claim 8, wherein detecting failure of the task is accomplished by detecting failure of the first ECU and selecting from the set of predetermined task reconfiguration strategies is performed as a function of the first ECU.

10. The on-board unit of claim 9, wherein a primary copy of a task is configured to be executed on the first ECU during normal operation and a secondary copy of the task is mapped to be on standby on the second ECU.

11. The on-board unit of claim 10, wherein selection of a reconfiguration strategy invokes the secondary copy of the task on the second ECU.

12. The on-board unit of claim 7, wherein the first reconfiguration strategy is generated as a function of (i) utilization data, concerning at least one of the first ECU and the second ECU, and (ii) utilization data concerning the failed task.

13. The on-board unit of claim 7, wherein detecting failure of the task is accomplished by detecting failure of the first ECU.

14. The on-board unit of claim 7, wherein the second reconfiguration strategy includes reconfiguration options that are ordered by at least one of reliability and availability.

15. A reconfiguration system, comprising:
- an on-board unit configured for use on a vehicle, comprising:
  - a processor; and
  - a computer-readable medium comprising applications that, when executed by the processor, cause the processor to perform acts including:
    - detecting failure of a task initially assigned to a first electronic control unit (ECU) of the vehicle;
    - generating a first reconfiguration strategy in response to detecting the failure, the first reconfiguration strategy including a reassignment of the task to a second ECU of the vehicle;
    - executing the first reconfiguration strategy;
    - gathering health data associated with at least the first ECU;
    - sending the health data to a remote unit;
    - receiving a second reconfiguration strategy from the remote unit; and
    - executing the second reconfiguration strategy; and
- a remote unit that is configured to be separate from the vehicle, comprising:
  - a processor; and
  - a computer-readable medium comprising applications that, when executed by the processor, cause the processor to perform acts including:
    - generating the second reconfiguration strategy as a function of the health data, fault models, and system models.

16. The reconfiguration system of claim 15, wherein generating the first reconfiguration strategy includes selecting from a set of predetermined task reconfiguration strategies.

17. The reconfiguration system of claim 16, wherein detecting failure of the task is accomplished by detecting failure of the first ECU and selecting from the set of predetermined task reconfiguration strategies is performed as a function of the first ECU.

18. The reconfiguration system of claim 15, wherein the first reconfiguration strategy is generated as a function of (i) utilization data, concerning at least one of the first ECU and the second ECU, and (ii) utilization data concerning the failed task.

19. The reconfiguration system of claim 15, wherein the second reconfiguration strategy includes reconfiguration options that are ordered by at least one of reliability and availability.

20. The reconfiguration system of claim 15, wherein generating the second reconfiguration strategy includes:
- determining a root cause of failure as a function of the health data and the fault models; and
- generating the second reconfiguration strategy as a function of the system models and the root cause of failure.

* * * * *